Nov. 2, 1943.　　　J. E. SMITH　　　2,333,207
ELECTRIC SOLDERING IRON
Original Filed April 29, 1938
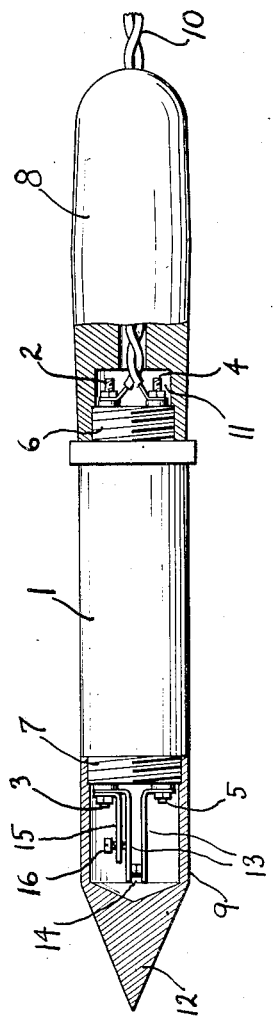
John Ernest Smith
INVENTOR.
BY W. Theodore Simmons,
ATTORNEY.

Patented Nov. 2, 1943

2,333,207

UNITED STATES PATENT OFFICE 2,333,207

ELECTRIC SOLDERING IRON

John Ernest Smith, Plainfield, N. J.

Original application April 29, 1938, Serial No. 205,047. Divided and this application March 5, 1940, Serial No. 322,366

5 Claims. (Cl. 219—26)

This invention relates to electrically heated soldering irons and more particularly to means for maintaining an even tip temperature.

This application is a division of my co-pending application, Serial No. 205,047, filed April 29, 1938, Patent No. 2,192,655.

It is one object of my invention to provide an electrically heated soldering iron in which the temperature at the working tip will be maintained substantially constant both during the time of use and during the time of non-use, the advantage being that once the soldering iron is connected to the source of electricity and brought up to working temperature, it will be ready for use instantaneously without any attention on the part of the operator.

It is another object of my invention to provide a construction and arrangement of the parts of a soldering iron so that they will be readily assembled and manufactured into a structure sturdy and serviceable and in which repairs, replacements and adjustments may be very easily made.

It is a further object of my invention to provide a soldering iron and an electrical heater therefor with means whereby the working temperature of the soldering tip may be varied to suit the particular conditions of use.

Other and further objects of my invention will be apparent from this specification taken in conjunction with the accompanying drawing wherein the single figure is an elevational view with parts broken away and shown in transverse section of a soldering iron embodying the features of my invention.

A heater 1, which may be constructed as more particularly described in my co-pending application referred to above, comprises a cylindrical body of cast aluminum which encloses an electrical heating element of coiled resistance wire that is embedded in ceramic material. In the construction illustrated, a strand of the heating element extends between the terminal pins 2 and 3 respectively on opposite ends of the heater 1 and a second strand of the heating element extends between terminal pins 4 and 5 likewise on opposite ends of the heater. The terminal pins 2 to 5 inclusive are rigidly supported in and by the metal body of the heater 1. The heater body is provided with reduced portions 6 and 7 on opposite ends thereof which are screw-threaded. A handle 8 of insulating material screws upon the threaded projection 6 and a soldering tip 9 screws upon the threaded projection 7. A pair of wires 10 extend longitudinally through the handle 8 and are respectively mounted upon the terminal pins 2 and 4 which are housed within cavity 11 of the handle.

The soldering tip is hollow except for the working tip portion 12. Mounted on terminal pins 3 and 5 are a pair of strips 13, each of which carries one of a pair of contact members 14 and one or the other of which is formed from thermometal or bimetallic strip stock. Thus the circuit for the heating element may be traced from one of the wires 10 that are connected to the source of power through the terminal pin 2 to the heating element, the terminal pin 3, the contact members 14, the terminal pin 5, the heating element connected thereto and the terminal pin 4 and thence through the other wire 10. Also mounted on the terminal pin 3 is another strip of metal 15 which carries an adjusting screw 16 in position to engage one of the contact strips 13.

As will be seen from the drawing, the arms 13 of the thermo-switch extend through the hollow tip 9 and adjacent to the working tip 12. In any event, the chamber in which the thermo-switch is located is directly responsive to variations in tip temperature. The working temperature of the tip can be adjusted to whatever are the conditions under which the soldering iron is being used, and if variations in temperature are due merely to the ambient conditions, as when the soldering iron is at rest, or whether the reduction in tip temperature is caused by its application to the work which thus reduces the temperature on the interior of the hollow tip, the result will be the immediate energization of the heating element to restore the tip temperature to its desired level. The described arrangement will be effective to maintain a substantially constant temperature at the tip.

On the other hand, if the heater and soldering iron are so proportioned that thermostatic regulation is not necessary to maintain the tip temperature constant within the practical limits needed, then the thermostatic switch can be adjusted to function as a protective device for the heating element to keep the same from burning out under improper conditions of use or non-use.

It may be pointed out that the heater body 1 is of aluminum or other metal of high thermal conductivity while the soldering tip is desirably of copper. The handle is constructed of any material suited for this service, the handle illustrated being substantially cylindrical and concentric with the heater 1 and tip 9, but other types of handle may be used. Likewise, other means may be used of making the electrical connections from the source of power to the heater 1.

Modifications may be made within the spirit and scope of my invention, and such modifications are intended to be covered by the appended claims.

I claim:

1. In a soldering iron, a heater comprising a body formed of metal of high thermal conductivity and enclosing an electrical heating element, terminal pins mounted at the tip end of said heater and connected in circuit with the heating element, a soldering tip secured to one end of said heater and having a hollow portion and a working tip of considerable mass, a thermally operated switch mounted on said terminal pins and extending into the hollow portion of said soldering tip and adjacent the working tip portion, said switch being responsive directly to variations in tip temperature and operatively connected to said heating element to maintain the tip temperature substantially constant, a handle connected to the heater remotely from the tip, and means for making electrical connections to said heating element from a source of current.

2. In a soldering iron, a heater comprising a cylindrical body formed of metal of high thermal conductivity and inclosing an electrical heating element, the body having reduced end portions, a handle mounted on one of said end portions and extending co-axially with the body, a soldering tip mounted on the opposite end portion and extending co-axially with the body, a chamber in the tip between the body and the point of application to the work, and a thermally responsive switch mounted in said chamber and connected in circuit with said heating element.

3. In a soldering iron, a heater comprising a solid body formed of metal of high thermal conductivity cast about an electrical heating element, terminal pins mounted at each end of said heater and connected in circuit with the heating element, means connecting the terminal pins at one end to a source of power, a thermally responsive switch mounted upon the terminal pins at the opposite end of the heater and controlling the circuit through said element, a soldering tip enclosing said switch, and a handle connected to the heater remotely from said tip.

4. In a soldering iron, an electrically heated body, a handle connected thereto, a soldering tip mounted on the body, the tip having a solid working tip portion and a chamber adjacent the same, and an adjustable thermally responsive switch mounted in the tip chamber so as to operate in accordance with variations in the working tip temperature, the switch being connected in circuit with the electrical heating means.

5. In a soldering iron, an electrically heated solid body, a working tip removably mounted thereon, the tip having a hollow chamber between the body and the point of application to the work, a thermally responsive switch mounted on one end of the heater body and enclosed in the chamber, the switch being connected in circuit to control the operation of the electrically heated body to maintain the temperature of the tip substantially constant, and a handle detachably mounted on said body.

JOHN ERNEST SMITH.